(12) United States Patent
Longhi et al.

(10) Patent No.: US 6,578,916 B2
(45) Date of Patent: Jun. 17, 2003

(54) ADAPTABLE SEAT

(75) Inventors: Alberto Longhi, Ferrara (IT); Amedeo Visconti, Turin (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 09/822,813

(22) Filed: Apr. 2, 2001

(65) Prior Publication Data

US 2002/0047297 A1 Apr. 25, 2002

(30) Foreign Application Priority Data

Apr. 4, 2000 (IT) ..................... BO2000A0191

(51) Int. Cl.[7] .................................................. A47C 7/14
(52) U.S. Cl. .............................. 297/284.3; 297/284.6; 297/284.9; 297/284.1; 5/653
(58) Field of Search ........................ 297/284.1, 284.2, 297/284.3, 284.4, 284.6, 284.9; 5/653, 654

(56) References Cited

U.S. PATENT DOCUMENTS 5,129,704 A 7/1992 Kishi et al. ............. 297/284 R
5,509,155 A * 4/1996 Zigarac et al. ........... 297/219.1
5,707,109 A 1/1998 Massara et al. .......... 297/284.9
5,916,664 A * 6/1999 Rudy ......................... 2/161.1
6,015,471 A * 1/2000 Rimington et al. ...... 156/274.4
6,203,105 B1 * 3/2001 Rhodes, Jr. ............. 297/284.6
6,212,719 B1 * 4/2001 Thomas et al. .......... 297/284.6

FOREIGN PATENT DOCUMENTS

GB 2 331 376 5/1999
JP 6-133829 5/1994
WO 98/37790 9/1998

* cited by examiner

Primary Examiner—Peter M. Cuomo
Assistant Examiner—Erika Garrett
(74) Attorney, Agent, or Firm—Jacobson Holman PLLC

(57) ABSTRACT

An adaptable seat having a supporting frame, and one or more supporting cushions appropriately arranged and fixed to the supporting frame to support the occupant; each supporting cushion having an outer shell and a filler; and the adaptable seat being characterized in that the outer shell of each supporting cushion has electrically controlled deforming means for selectively deforming the outer shell to adjust the shape of the supporting cushion; an electronic central control unit being provided to control the electrically controlled deforming means.

20 Claims, 1 Drawing Sheet

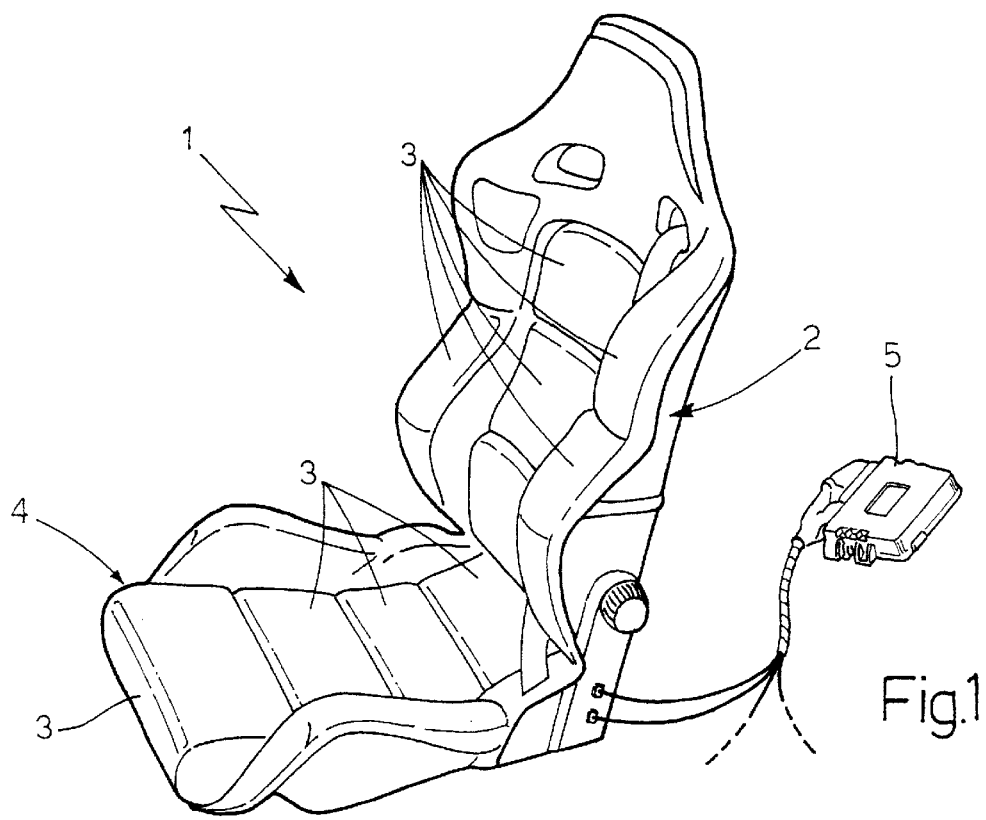
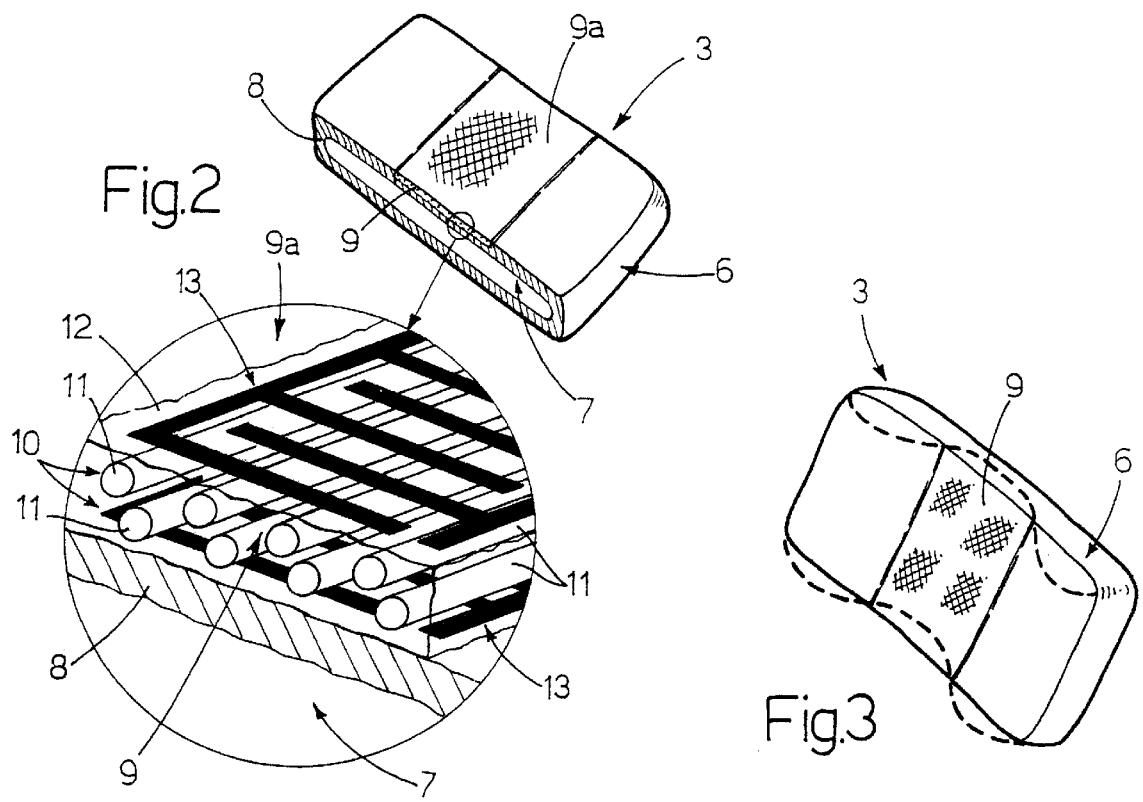

ADAPTABLE SEAT

The present invention relates to an adaptable seat.

More specifically, the present invention relates to an adaptable seat for motor vehicles and similar, to which the following description refers purely by way of example.

BACKGROUND OF THE INVENTION

As is known, in recent years, a demand has arisen to equip high-performance motor vehicles with seats capable of adapting certain characteristics, such as stiffness or body support, to the attitude of the vehicle, and which, in particular, can be made stiffer and more supportive in a racing attitude, but without impairing the comfort of the seat under normal driving conditions.

By way of a solution to the problem, adaptable seats have been developed featuring a series of bladders, which are inflated or deflated on command by an electronic central control unit to adapt the stiffness and shape of the seat rapidly to driver requirements and/or the attitude of the vehicle.

Adaptable seats of the above type, however, are seriously handicapped by a relatively slow response time, and by being extremely complicated and expensive to produce. In addition to an electronic central control unit, such seats, in fact, also require a compressor for supplying pressurized air, and a solenoid valve assembly for controlling air flow to and from the individual bladders.

SUMMARY OF THE INVENTION

It is an object of the present invention to provide an adaptable seat designed to eliminate the aforementioned drawbacks.

According to the present invention, there is provided an adaptable seat comprising a supporting frame, and at least one supporting cushion fixed to the supporting frame to support the occupant; said at least one supporting cushion comprising an outer shell and a filler; and the adaptable seat being characterized in that the outer shell of said supporting cushion comprises electrically controlled deforming means for selectively deforming the outer shell to adjust the shape of the supporting cushion.

The present invention also relates to a vehicle comprising at least one adaptable seat as claimed in any one of claims 1 to 9.

BRIEF DESCRIPTION OF THE DRAWINGS

A non-limiting embodiment of the present invention will be described by way of example with reference to the accompanying drawings, in which:

FIG. 1 shows a view in perspective, with parts removed for clarity, of an adaptable seat in accordance with the teachings of the present invention;

FIG. 2 shows a larger-scale section of a cushion of the FIG. 1 seat;

FIG. 3 shows a schematic view of the FIG. 2 cushion in two different configurations.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Number 1 in FIG. 1 indicates as a whole an adaptable seat which may be used to advantage on motor vehicles and similar.

Adaptable seat 1 comprises an inner supporting frame 2 made preferably, though not necessarily, of metal and/or plastic materials; one or more supporting cushions 3 (twelve in the example shown) appropriately arranged and fixed to inner frame 2 to support the occupant; and upholstering 4 made preferably, though not necessarily, of leather and/or select fabrics.

Supporting cushions 3 are shaped according to the location on the seat, and comprise a closed, appropriately shaped outer shell 6; and a filler 7 which may be defined indifferently by pressurized gas, known foam padding or similar.

With reference to FIGS. 2 and 3, outer shell 6 is defined by an elastic sealing membrane 8 capable of preventing leakage of filler 7, be it gas or foam; and by an active membrane 9 made at least partly of composite material deformable on command by applying a voltage.

More specifically, active membrane 9 is made at least partly of a composite material comprising active fibers of a material with piezoelectric properties. When subjected to an electric field, the fibers are deformed and altered in length to deform the enclosing body. The type of deformation produced depends, obviously, on how the active fibers of piezoelectric material are distributed within the body.

More specifically, in the example shown in FIG. 2, a longitudinal portion 9a of active membrane 9 is defined by a layer 9a of active composite material comprising one or more (in the example shown, two) flat belts 10 of monofilament active fibers 11 embedded in a matrix 12 of polymer material; and two surface electrodes 13 made of electrically conducting material and located on opposite sides of flat belts 10.

So located, electrodes 13 define a parallel-plate capacitor capable of generating between its plates, i.e. in the space in which monofilament active fibers 11 are distributed, an electric field depending on the voltage applied to electrodes 13.

The monofilament active fibers 11 in each flat belt 10 are made, as stated, of material with piezoelectric properties, so as to change in length when subjected to an electric field, and extend parallel to one another along the whole length of longitudinal portion 9a. More specifically, in the example shown, monofilament active fibers 11 of each flat belt 10 extend parallel to one another along a substantially straight path from one lateral edge of the cushion to the other.

It should be pointed out that flat belts 10 may also be arranged so that the monofilament active fibers 11 in one belt are perpendicular to those in the other belt, so as to obtain a fabric capable of deforming in two perpendicular directions.

It should also be pointed out that outer shell 6 may also be defined by one membrane made at least partly of composite material deformable on command by applying a voltage, and which at the same time prevents leakage of the filler from supporting cushion 3.

In the example shown in FIG. 2, each surface electrode 13 is defined by a copper mesh arranged evenly on or close to the surface of layer 9a of composite material, and monofilament active fibers 11 are made of piezoceramic material, such as lead zirconate titanate (known as PZT) currently produced by CeraNova Corporation in America.

With reference to FIG. 1, adaptable seat 1 also comprises an electronic central control unit 5 for controlling and producing controlled deformation of active membrane 9 of each supporting cushion 3 on command, and so compressing or expanding supporting cushion 3 to alter its shape and stiffness.

More specifically, electronic central control unit 5 is connected electrically to electrodes 13 on active membrane 9 of each supporting cushion 3, and provides for selectively imposing a given, possibly time-variable, electric potential difference between electrodes 13 to deform monofilament active fibers 11 and so produce controlled deformation of the cushion.

With reference to FIG. 3, assuming monofilament active fibers 11 contract when subjected to an electric field, and that supporting cushion 3 is filled with pressurized gas, electronic central control unit 5 may, in given operating conditions, activate active membrane 9 to reduce the volume and at the same time increase the stiffness of the cushion. When the volume of supporting cushion 3 is reduced, the occupant obviously sinks down and is enclosed more firmly in the seat.

Given the extremely fast response of the system, electronic central control unit 5 may possibly also control active membrane 9 of each supporting cushion 3 as a function of signals from one or more sensors located on the vehicle. For example, using accelerometer signals, as the vehicle approaches maximum traction, electronic central control unit 5 may stiffen the lateral supporting cushions 3 of the seat to give the driver direct and suitably advanced warning of impending danger.

For example, outer shell 6 of one or more supporting cushions 3 may be provided with two or more independent active membranes 9 to provide for additional adjustment. Such variations are not to be regarded as a departure from the spirit and scope of the invention, and all such modifications as would be recognized by one skilled in the art are intended to be included within the scope of the following claims.

Preferably, though not necessarily, electronic central control unit 5 may control active membranes 9 of supporting cushions 3 to massage the driver's body while driving.

Operation of adaptable seat 1 as described and illustrated herein is self-explanatory.

The advantages of the present invention are obvious: adaptable seat 1 has a much faster response as compared to similar currently marketed products, and, being extremely straightforward and lightweight in design, drastically reduces weight and size problems.

Adaptable seat 1 as described and illustrated also has the further advantage of improving driving comfort and greatly enhancing the active safety level of the vehicle. The driver's attention span, in fact, is improved by immediately adapting the characteristics of the seat to the actual driving conditions of the vehicle.

Adaptable seat 1 with active membranes 9 can be integrated easily into inflation and deflation systems of known cushions to provide for additional adjustment.

Clearly, changes may be made to adaptable seat 1 as described and illustrated herein without, however, departing from the scope of the present invention.

In particular, outer shell 6 of one or more supporting cushions 3 may be provided with two or more independent active membranes 9 to provide for additional adjustment.

What is claimed is:

1. An adaptable seat comprising a supporting frame and at least one supporting cushion fixed to the supporting frame and adapted to support an occupant, said at least one supporting cushion having an outer shell and a filler encased therein, said outer shell defined by electrically controlled deforming means therein for being selectively deformed and thereby deforming the outer shell to adjust a shape of the supporting cushion.

2. The adaptable seat as claimed in claim 1, further comprising an electronic central control unit for controlling on command said electrically controlled deforming means.

3. The adaptable seat as claimed in claim 1, wherein said electrically controlled deforming means includes an active membrane made at least partly of composite material deformable on command by application of a voltage.

4. The adaptable seat as claimed in claim 3, wherein said composite material includes active fibers made of material having piezoelectric properties, said active fibers, when subjected to an electric field, being deformable by changing in length to deform the cushion in which they are enclosed.

5. The adaptable seat as claimed in claim 3, wherein said active membrane is defined at least partly by a layer of active composite material including at least one flat belt of active fibers embedded in a matrix of polymer material, and two electrodes made of electrically conducting material and located on opposite sides of said at least one flat belt of active fibers, said active fibers being monofilament fibers.

6. The adaptable seat as claimed in claim 5, wherein said active fibers extend substantially parallel to one another along a substantially straight path.

7. The adaptable seat as claimed in claim 4, wherein said active fibers are made of piezoceramic material.

8. The adaptable seat as claimed in claim 5, wherein each said electrode includes a mesh of electrically conducting material arranged on or close to a surface of said layer of active composite material.

9. The adaptable seat as claimed in claim 1, wherein the outer shell of said supporting cushion includes an elastic sealing membrane to prevent leakage of the filler.

10. An adaptable seat comprising a supporting frame and at least one supporting cushion fixed thereto and adapted to support an occupant, said at least one supporting cushion having an outer shell and a filler encased therein, said outer shell defined by electrically responsive fibers which, when selectively deformed, adjust a shape of the supporting cushion.

11. The adaptable seat as claimed in claim 10, wherein said fibers are made of a piezoelectric material which, when subjected to an electric field, changes in length to deform said cushion.

12. The adaptable seat as claimed in claim 10, wherein said fibers are embedded in a matrix of polymer material.

13. The adaptable seat as claimed in claim 10, wherein said active fibers extend substantially parallel to one another along a substantially straight path.

14. The adaptable seat as claimed in claim 10, wherein said active fibers are made of piezoceramic material.

15. The adaptable seat as claimed in claim 14, wherein said piezoceramic material is lead zirconate titanate (PZT).

16. The adaptable seat as claimed in claim 10, wherein said fibers form an active membrane that is defined at least partly by a layer of active composite material including at least one flat belt of active fibers embedded in a matrix of polymer material, and two electrodes made of electrically conducting material and located on opposite sides of said at least one flat belt of active fibers.

17. The adaptable seat as claimed in claim 16, wherein each said electrode includes a mesh of electrically conducting material arranged on or close to a surface of said layer of active composite material.

18. An adaptable seat comprising a supporting frame and at least one supporting cushion, said at least one supporting cushion having an outer shell and a filler encased therein, said outer shell including an active membrane having an electrode made of electrically conductive material therein, said active membrane made at least partly of composite material which is deformable in response to a voltage applied thereto through said electrode to adjust a shape of the supporting cushion.

19. The adaptable seat as claimed in claim 18, wherein said composite material includes active fibers made of material having piezoelectric properties, said active fibers changing in length when subjected to an electric field to deform the cushion.

20. The adaptable seat as claimed in claim 18, wherein said electrode includes a mesh of electrically conducting material arranged on or close to a surface of said composite material.

* * * * *